United States Patent [19]

Stock

[11] 4,251,096
[45] Feb. 17, 1981

[54] BUMPER AND FIXINGS

[75] Inventor: Malcolm G. Stock, Nantwich, England

[73] Assignee: Rolls-Royce Motors Limited, Crewe, England

[21] Appl. No.: 956,924

[22] Filed: Oct. 31, 1978

[30] Foreign Application Priority Data

Nov. 10, 1977 [GB] United Kingdom ............... 46784/77

[51] Int. Cl.³ ............................................. B60R 19/08
[52] U.S. Cl. .................................... 293/150; 293/126; 293/151
[58] Field of Search ............... 293/126, 149, 150, 151, 293/152

[56] References Cited

U.S. PATENT DOCUMENTS

| 3,820,834 | 6/1974 | Wilfert et al. | 293/150 |
| 3,823,968 | 7/1974 | Barenyi | 293/150 |

Primary Examiner—Robert R. Song
Attorney, Agent, or Firm—Cushman, Darby & Cushman

[57] ABSTRACT

A bumper assembly for a vehicle comprises a center section adapted to lie along the width of the vehicle and two side sections connected to respective ends of the center section and adapted to lie along respective sides of the vehicle. Each section has a supporting metal beam and a superposed polyurethane moulding. The center section additionally has a superposed decorative steel finisher connected to the beam in a relatively displaceable manner. The side sections are connected at their ends remote from the center section by spring pivotal radius arms to the vehicle body. In the event of an impact, the side sections pivot away from the vehicle body on their radius arms against the action of the associated springs and the metal beam moves relative to the finisher against the action of a further spring. On removal of the impact force the parts of the assembly return to their original positions under the action of the various springs.

7 Claims, 5 Drawing Figures

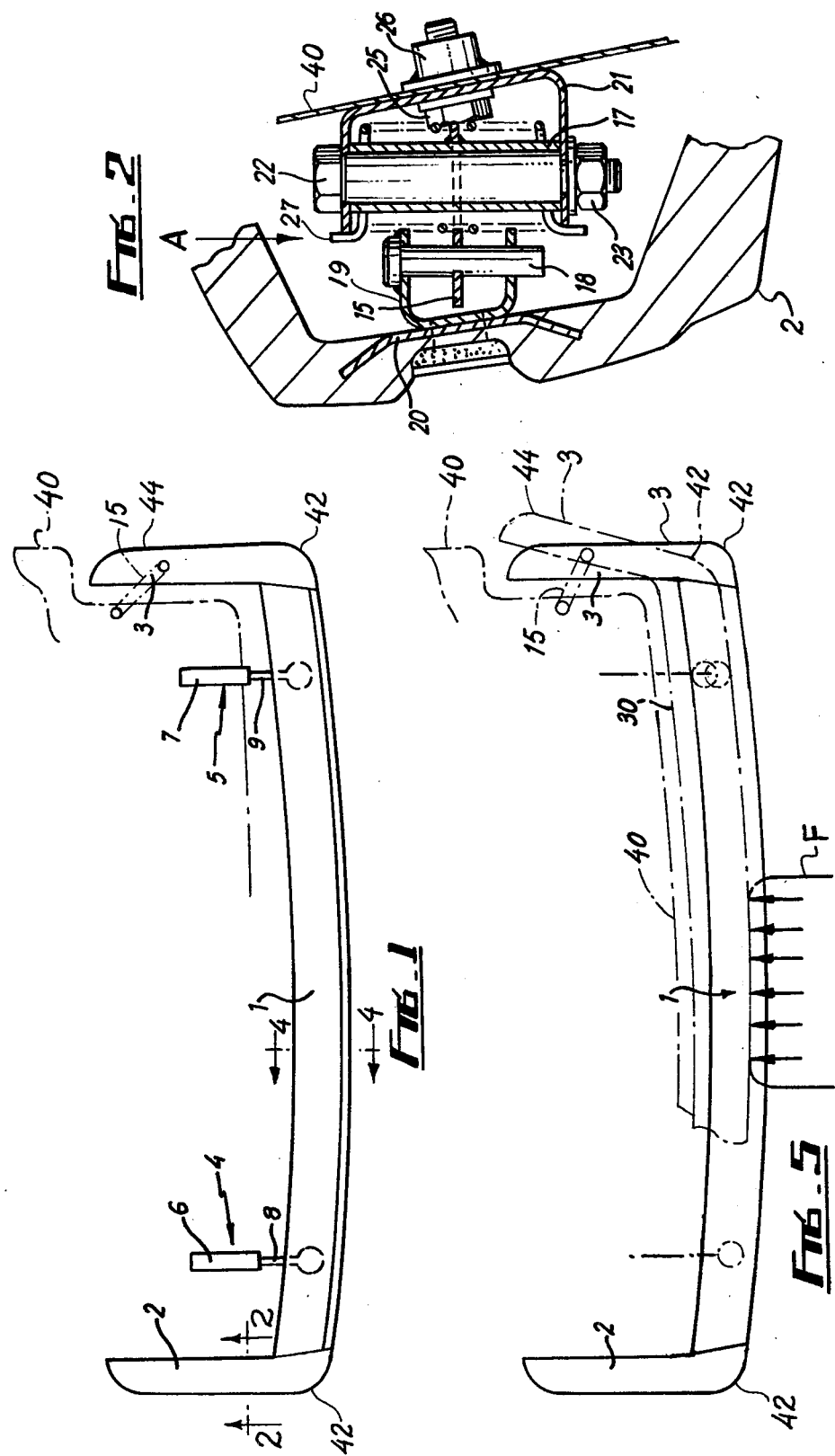

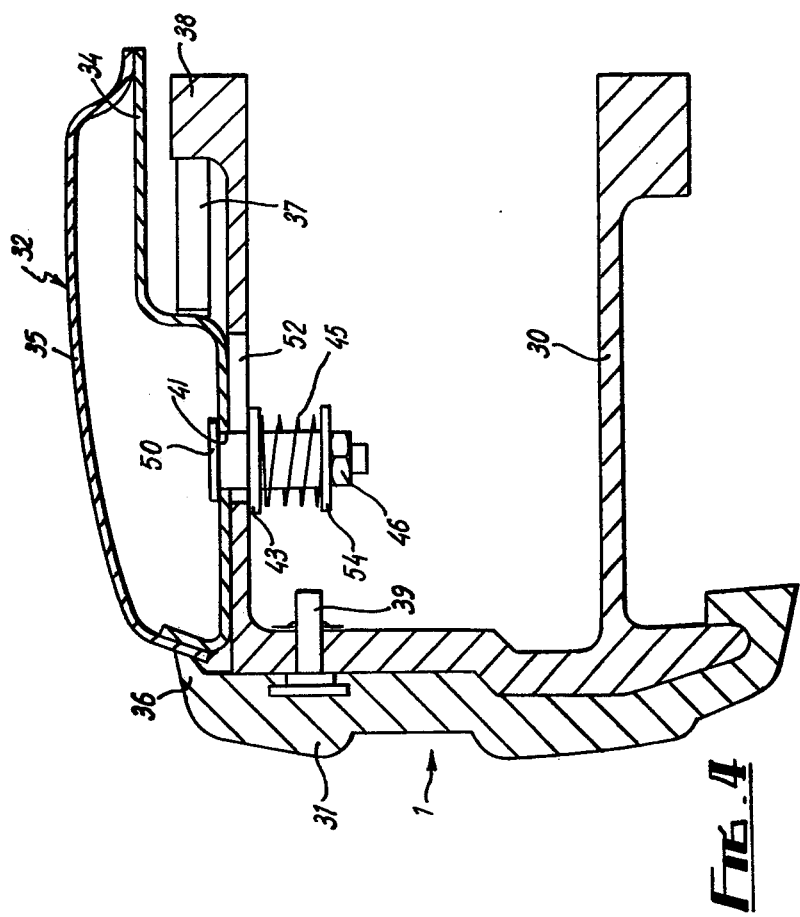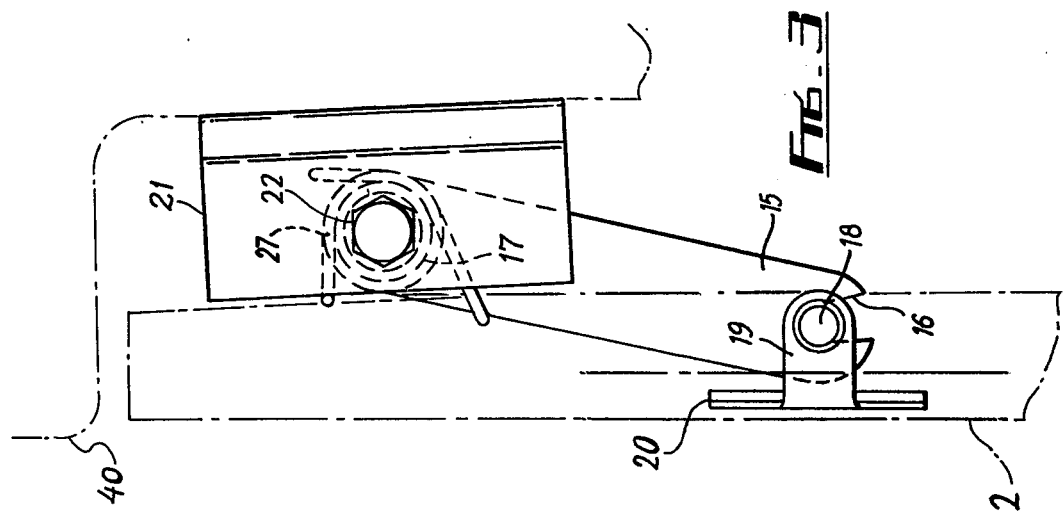

BUMPER AND FIXINGS

The present invention relates to a bumper arrangement for a vehicle.

Energy absorbing vehicle bumper arrangements are already known comprising a centre section adapted to protect the front or rear of the vehicle and two side sections extending from respective ends of the centre section and adpated to protect respective sides of the vehicle adjacent the front or rear as the case may be. Where these side sections are of limited length it is often possible to provide supports for them by supporting them only at their ends adjacent the centre portion. Where the natural resilience of the material of the side sections combined with their length makes it necessary to support the side sections at another point along their length, provision must be made for relative movement to take place between these side sections and the adjacent car body if the car body sides are not to be damaged by the centre section moving into the car body under impact and carrying the side sections with them. Such an arrangement is indeed already known but is disadvantageous in that it does not provide for vehicles having curved sides or, for vehicles provided with a continuous projection on the wheel arches. With this known arrangement, with vehicles of the form above described, movement of the side sections relative to the car body would result in the side sections eventually being pushed into the car body itself.

According to one aspect of the present invention, there is provided a bumper arrangement for a vehicle comprising a centre secion and side sections connected at opposite ends respectively of the centre section each side section being provided with means for connecting it to the adjacent side of the vehicle body which enable the side section to move or deflect away from the car body when the bumper arrangement is subjected to a force having a component in the longitudinal direction of the vehicle.

According to another aspect of the present invention, there is provided a vehicle comprising a bumper arrangement as specified above.

A preferred embodiment of the invention may comprise any one or more of the following advantageous features:

(a) The means for connecting the side section to the adjacent side of the vehicle comprises an arm which is adapted to be pivotally connected at one end to the adjacent side of the vehicle and at the other end is pivotally connected to the side section.

(b) The pivotal connection at the said one end of (a) comprises a U-shaped bracket apertured in its base to receive a fixing element for connection to the adjacent side of the vehicle and apertured in its arms to receive a pivot tube through which a bolt extends and which is connected to the corresponding end of the arm itself.

(c) The pivotal connection at the said other end of the arm of (a) comprises a pin extending through the apertures of the apertured arms of a U-shaped bracket the base of which is connected to the side section, the pin being received in a slot cut for this purpose and the corresponding ends of the arm.

(d) Resilient means are provided to urge the side section in towards the corresponding side of the vehicle.

(e) The resilient means of (d) comprises a spring.

(f) The spring of (e) is a torsion spring concentrically disposed around the pivot tube.

(g) Each section comprises a metal support member and a superposed moulded synthetic plastics material part.

(h) Each side section is bolted to the corresponding end of the centre section.

In order that the invention may be more clearly understood, one embodiment of the invention will now be described, by way of example, with reference to the accompanying drawings, in which:

FIG. 1 shows a plan diagrammatic view of a rear bumper arrangement for a vehicle, FIG. 2 is an enlarted fragmentary sectional view taken substantially on the line 2—2 of FIG. 1, parts being omitted for the purpose of clarity, FIG. 3 is a view taken in the direction of the arrow A of FIG. 2, FIG. 4 is a cross section through the centre section of the bumper arrangement of FIG. 1, the view being taken on the line 4—4 of FIG. 1, and FIG. 5 diagrammatically illustrates in broken lines the relative movement of parts of the centre section and one of the side sections of the bumper arrangement of FIG. 1 when the arrangement is subjected to an impact.

Referring to FIG. 1, the rear bumper arrangement comprises a centre section 1 and two side sections 2 and 3 extending substantially at right angles from opposite ends respectively of the centre section 1. Each section comprises a supporting metal beam or member 30 and a superposed polyurethane moulding 31. The centre section 1 is connected to the chassis or a main support member of the vehicle body 40 through two spaced energy absorbing units 4 and 5. Each of the units 4, 5 comprises a cylinder 6, 7 and a piston 8, 9. The cylinder 6, 7 is connected to the chassis and the piston 8, 9 is bolted to the bumper main beam 30 of the center section 1 or to a bracket connected to it.

Each side section 2, 3, is connected at one end 42 to the adjacent end of the centre section 1 and at or near its other end 44 to the body 40 of the vehicle. The connection at this other end 44 comprises a radius arm 15 which is slotted at 16 at one of its ends and welded at its other end to a pivot tube 17. The slot 16 receives a pin 18 brazed to a link bracket 19 fixed to a receiving plate 20, FIGS. 2 and 3, in the side sections 2 and 3. At the other end of the radius arm 15, the pivot tube 17 is aligned with apertures formed in the arms of the U of a U-shaped bracket 21 carried by the chassis of the vehicle body 40. A threaded bolt 22 is inserted through the apertures and a pivot tube 17 and fixed in position by a complementary screwthreaded nut 23. The U-shaped bracket 21 has two apertures drilled in its base. These apertures are aligned with corresponding apertures drilled in the body 40 of the vehicle and two threaded bolts 25 are inserted through respective pairs of aligned apertures and screwed into complementary tapped blocks 26 disposed on the inside of the vehicle body. The radius arm 15 which, with its pivots, is housed within the polyurethane moulding of the side section in its rest position is urged in towards the side of the vehicle by means of a torsion spring 27 thus holding the side section in towards the vehicle side. This spring 27 is concentrically disposed around the pivot tube 17 and its ends are constrained by radius arm 15 itself and the bracket 21.

In operation, when the bumper arrangement is subjected to an impact force F on its centre section 1 causing it to move into the vehicle body, the side sections, being connected to the centre section, move in the direction of the longitudinal axis of the vehicle relative to the vehicle body. This relative movement in turn causes the radius arms 15 to pivot out from the side of the vehicle body so that the ends of the side sections 2 and 3 clear the vehicle body and do not damage it. When the impact force is removed the energy stored in the springs 27 pulls the side sections 2 and 3 back into the sides of the vehicle body as the centre section 1 is returned to its original position by the units 4 and 5. There is sufficient flexibility in the side sections 2 and 3 themselves to enable them to be deflected about the points at which they are connected as indicated at 42 to the centre section 1.

Referring to FIG. 4, the centre section 1, which as already mentioned comprises a supporting metal (aluminium) beam 30 and superposed hard polyurethane moulding 31, is constructed to allow relative movement between the beam 30 and or decorative steel finisher 32 which overlies the aluminium beam 30. The finisher 32 comprises an underlying support piece 34 and overlying decorative piece 35 and is constrained between a lip 36 of the hard polyurethane moulding 31 and a spring device 37 which abuts a flange or web 38 formed on the aluminium beam 30.

The moulding 31 is fixed to the aluminium beam 30 by means of pins 39 and the finisher 32 is clamped to the beam disposed below it by means of a spring loaded bolt 50. Each such bolt extends through an aperture 41 formed in the piece 34, a corresponding slot 52 formed in the beam 30, two flanges 43 and 54 and a spring device 45 constrained between the flanges 43 and 54 and a nut 46. The force with which the finisher 32 and beam 30 are clamped together may be varied by appropriate selection and/or degree of compression of the spring 45.

In operation when the centre section 1 is subjected to the force of an impact such as is diagrammatically illustrated in FIG. 5, the curved beam 30 and moulding 31 deflect but the finisher 32 retains its shape by sliding away from the impact, the bolts 50 sliding in the slots 52. When the impact force is removed the beam and moulding return to their original shapes due to their natural resilience and the compressed spring device 37 pushes the finisher 32 back to its original position, the bolts 52 again sliding in the slots 42.

It will be appreciated that the above embodiments have been described by way of example only and that many variations are possible without departing from the scope of the invention claimed.

What is claimed is:

1. A bumper arrangement for a vehicle comprising: a center section, side sections operatively connected at opposite ends respectively of said center section, means connecting each of said side sections to a respective side of the vehicle body, said means being operative to cause said side sections to move outwardly away from the vehicle body when the bumper arrangement is subjected to a force having a component in a longitudinal direction of the vehicle, and each of said means for connecting the respective side section to the vehicle body comprises a rigid arm having a first pivotal connection at one end to the vehicle body and a second pivotal connection at the other end to the side section, said first and second pivotal connections having a fixed distance between the same.

2. A bumper arrangement as claimed in claim 1, in which said first pivotal connection at the said one end comprises a O-shaped bracket apertured in its base to receive a fixing element for connection to the adjacent side of the vehicle body and apertured in its arms to receive a pivot tube through which a bolt extends and which is connected to the corresponding end of the arm itself.

3. A bumper arrangement as claimed in claim 2, in which said second pivotal connection at the said other end of the arm comprises a pin extending through the apertures of the apertured arms of a U-shaped bracket the base of which is connected to the side section, the pin being received in a slot cut in the corresponding end of the arm.

4. A bumper arrangement as claimed in claim 1, in which resilient means are provided to urge each side section in towards the corresponding side of the vehicle body.

5. A bumper arrangement as claimed in claim 4, in which the resilient means comprises a spring.

6. A bumper arrangement for a vehicle comprising a center bumper section, side bumper sections operatively connected at opposite ends respectively of said center bumper section, a rigid arm for each side bumper section, each rigid arm being pivotally connected at one end to the respective one of said side bumper sections at a spaced distance from the side bumper section's connection to the center bumper section and at the other end to the vehicle body whereby when the bumper arrangement is subjected to a force having a component in the longitudinal direction of the vehicle, the side bumper section moves outwardly and away from the vehicle body, and resilient means normally urging each of said side bumper sections towards the vehicle body.

7. A bumper arrangement as claimed in claim 6 in which said resilient means include a spring coacting with said vehicle body and with the respective side bumper section.

* * * * *